United States Patent
Spedini

(10) Patent No.: US 11,524,912 B2
(45) Date of Patent: Dec. 13, 2022

(54) PRESSOSTATIC ODOR CONTROL COVER FOR SLURRY TREATMENT TANK WITH DEVICE FOR REDUCING THE INNER VOLUME OCCUPIED BY HARMFUL AND MALODOROUS GASES

(71) Applicant: ECOMEMBRANE S.R.L., Gadesco Pieve Delmona (IT)

(72) Inventor: Lorenzo Spedini, Cremona (IT)

(73) Assignee: ECOMEMBRANE S.R.L., Gadesco Pieve Delmona (IT)

(*) Notice: Subject to any disclaimer, the term of this patent is extended or adjusted under 35 U.S.C. 154(b) by 1044 days.

(21) Appl. No.: 16/307,028

(22) PCT Filed: May 31, 2017

(86) PCT No.: PCT/IT2017/000110
§ 371 (c)(1),
(2) Date: Dec. 4, 2018

(87) PCT Pub. No.: WO2017/212503
PCT Pub. Date: Dec. 14, 2017

(65) Prior Publication Data
US 2019/0218123 A1    Jul. 18, 2019

(30) Foreign Application Priority Data
Jun. 6, 2016    (IT) .................. 102016000057478

(51) Int. Cl.
*C02F 3/00*    (2006.01)
*C02F 11/02*    (2006.01)
(Continued)

(52) U.S. Cl.
CPC ............... *C02F 3/00* (2013.01); *A01C 3/028* (2013.01); *B01D 1/00* (2013.01); *B01D 1/30* (2013.01);
(Continued)

(58) Field of Classification Search
CPC ... A01C 3/028; C02F 3/00; C02F 1/20; C02F 11/02; C02F 1/24; C02F 1/40;
(Continued)

(56) References Cited

U.S. PATENT DOCUMENTS 4,356,933 A * 11/1982 Connolly ............... E04H 4/0056
220/495.1
2013/0200007 A1 * 8/2013 O'Konek ................ C02F 1/385
210/205
(Continued)

FOREIGN PATENT DOCUMENTS

AT           388 158      5/1989
DE    20 2012 104 310 U1  2/2014
(Continued)

OTHER PUBLICATIONS

AT388158 Moschner et al.—Gas Reservoir (Abstract & MT; May 10, 1989; 11 pages) (Year: 1989).*
(Continued)

*Primary Examiner* — Hayden Brewster
(74) *Attorney, Agent, or Firm* — Nixon & Vanderhye

(57) ABSTRACT

Disclosed is a pressostatic odor control cover for slurry treatment tank with a device for reducing the inner volume occupied by harmful and malodorous gases emitted from the surface of the slurry. The treatment tank is delimited by a base and by lateral containment walls. The cover includes: a gas impermeable flexible membrane; a gas-tight continuous fixing unit of a margin of the membrane to the tank; an insufflation unit of air inside the cover; and a discharge valve of the air out of the cover. The odor control cover also includes a diaphragm permeable to liquids and to gases, arranged to delimit a reduced volume of the odor control cover available to the harmful gases and to the malodorous substances released from the slurry. The air insufflation unit
(Continued)

is connected to the cover above the diaphragm. The discharge valve is connected to the cover below the diaphragm.

10 Claims, 3 Drawing Sheets

(51) Int. Cl.
*C02F 1/24* (2006.01)
*C02F 1/40* (2006.01)
*A01C 3/02* (2006.01)
*C02F 1/20* (2006.01)
*B01D 1/30* (2006.01)
*B01D 1/00* (2006.01)
*C02F 1/00* (2006.01)
*C02F 11/00* (2006.01)

(52) U.S. Cl.
CPC ............ *C02F 1/20* (2013.01); *C02F 11/02* (2013.01); *C02F 1/24* (2013.01); *C02F 1/40* (2013.01); *C02F 11/00* (2013.01); *C02F 2001/007* (2013.01); *C02F 2201/004* (2013.01); *C02F 2201/005* (2013.01); *C02F 2209/03* (2013.01); *C02F 2303/02* (2013.01); *C02F 2303/14* (2013.01); *F17C 2201/0104* (2013.01); *F17C 2201/032* (2013.01); *F17C 2201/052* (2013.01); *F17C 2203/0685* (2013.01)

(58) Field of Classification Search
CPC ............ C02F 11/00; C02F 2001/007; C02F 2201/004; C02F 2201/005; C02F 2209/03; C02F 2303/02; C02F 2303/14; F17C 2201/032; F17C 2201/052; F17C 2203/0685
USPC ......................................................... 454/241
See application file for complete search history.

(56) References Cited

U.S. PATENT DOCUMENTS

2015/0329396 A1* 11/2015 Presby ................. C02F 1/44
 210/194
2017/0233275 A1* 8/2017 Segroves ........... B01D 21/0042
 210/702

FOREIGN PATENT DOCUMENTS

EP 1 516 975 3/2005
GB 1 586 767 3/1981

OTHER PUBLICATIONS

International Search Report, PCT/IT2017/000110, dated Oct. 16, 2017.
Written Opinion, PCT/IT2017/000110, dated Oct. 16, 2017.

* cited by examiner

PRESSOSTATIC ODOR CONTROL COVER FOR SLURRY TREATMENT TANK WITH DEVICE FOR REDUCING THE INNER VOLUME OCCUPIED BY HARMFUL AND MALODOROUS GASES

FIELD OF APPLICATION

The invention falls within the field of accessory equipment for the purification of slurry.

The invention in particular concerns a pressostatic odor control cover for slurry treatment tanks, adapted to contain harmful gases and volatile odorous substances, which develop as a result of chemical-physical or biological phenomena, and provided with a system for reducing the inner volume occupied by said harmful gases and said malodorous substances.

STATE OF THE ART

It is known that in purification systems of waste of civil, industrial or animal origin, volatile substances develop and tend to be released into the atmosphere, creating problems of emissions or odors or gases harmful for the environment.

Therefore, there is the problem of preventing the spreading of unpleasant odors, above all from tanks positioned at the end of systems, such as grit and oil removal, sedimentation, flotation tanks, etc.

There is also the problem of carrying out ordinary and special maintenance on the apparatus that equip tanks.

These tanks are generally made of concrete and comprise a flat or conical bottom and vertical containment walls.

Often they are also provided with a travelling bridge scraper for the collection of sedimented and/or floating materials.

To avoid harmful gases and malodorous substances from escaping, these tanks are often covered with metal, fiberglass or membrane structures, maintained with vacuum pressure or slightly pressurized to allow the malodorous gases to be conveyed to a purification system, generally with biofilters.

The membrane covers are essentially pressostatic domes made with a gas-tight flexible membrane, generally in PVC coated polyester fabric, and provided with continuous fixing means of a margin of said membrane to the tank below.

The pressostatic covers also comprise insufflation means of pressurized air below said membrane and discharge valve means of the air, mixed with the harmful gases and the malodorous substances, to be sent to a treatment plant.

The fixing means of the membrane to said tank generally comprise a steel profile adapted to retain, by means of anchor bolts and nuts, the margin of the membrane against the upper edge of said tank.

To cover a tank with a pressostatic cover it is necessary to follow a curved surface of a shape similar to a cone or a part of a cone, to a sphere or part of a sphere, or to a cylinder or a part of a cylinder.

The tensile force to which the membrane is subjected at the anchor depends both on the operating pressure of the air insufflated and contained under the dome, and on the radius of curvature of the shape selected for the cover.

The tensile force tangent to the membrane can be divided into two components, one vertical and one horizontal. This latter is the most problematic component in stress distribution as it can cause tears along the edge of the membrane and damages to the structure for anchoring to the tank.

In substance, in order to limit the stress generated by the membrane cover within values that can be supported by the membrane material and by the metal anchoring structure below, covering domes must be produced with considerable heights.

These pressostatic covers have some limits and drawbacks due to the fact that they subtend a large volume of air contaminated by the gases and by the odors released by slurries.

The contaminated air mixed with the volatile substances released from slurries contains degrading substances that can, in the long term, damage the whole membrane. Any deposits and residues of the gases and of the emissions produced by the slurries and by the waste contained in the tank can also cause breakage of the cover.

Unfortunately, the costs to repair or replace the whole membrane can be very high.

Moreover, in order to allow an operator, not wearing an oxygen mask, to access the cover to carry out maintenance operations, regulations provide that "washes" must be carried out, obtained with predetermined air change rates per hour of the volume of air present under the cover, producing vast quantities of polluted air.

A large volume of air polluted by harmful gases and malodorous substances to be treated by means of specific mechanical or biological filtering systems requires a substantial amount of energy and is expensive.

PRESENTATION OF THE INVENTION

The object of the present invention is to eliminate the problems described herein and to produce a pressostatic odor control cover for slurry treatment tanks provided with a device for reducing its inner volume for containing the gases, to protect the membrane from deterioration caused by the degrading substances produced and to facilitate operations to change the air, to treat the polluted air and thus allow operators to access the tank to carry out maintenance operations without having to remove the cover.

The objects are achieved with a pressostatic odor control cover for slurry treatment tank with device for reducing the inner volume occupied by harmful and malodorous gases emitted from the surface of the slurry, where said treatment tank is delimited by a base and by lateral containment walls, where said pressostatic odor control cover comprises:

a gas impermeable flexible membrane;
gas-tight continuous fixing means of a margin of said membrane to said tank;
insufflation means of air inside said cover;
discharge valve means of said air out of said cover;
characterized in that:
said odor control cover also comprises a diaphragm permeable to liquids and to gases, arranged to delimit a reduced volume of said odor control cover available to the harmful gases and to the malodorous substances released from the slurry;
said air insufflation means are connected to said cover above said diaphragm;
said discharge valve means are connected to said cover below said diaphragm.

Advantageously, said diaphragm permeable to liquids and to gases comprises a fine mesh net.

According to a first aspect of the invention, said cover comprises mechanical fixing means, not air-tight, for fixing said diaphragm to said membrane.

In a preferred variant of the invention, said mechanical fixing means are of point type, distributed along the edge of said diaphragm, and in particular comprise eyelets welded to said membrane and tapes, at least partially covered in Velcro® adapted to fold over themselves and to engage said eyelets passing through a portion of the edge of said diaphragm.

According to a further aspect of the invention, said mechanical fixing means also comprise connection means substantially of continuous type, which extend along the edge of said diaphragm, and in particular comprise a strip of hooks of Velcro® applied along a horizontal plane of said cover, and a strip of loops applied along the edge of said diaphragm.

Advantageously, said cover comprises pipes, arranged transverse to said diaphragm along its edge, adapted to define through holes, to allow the insufflated air to flow under said diaphragm.

Moreover, said fixing means comprise at least a supporting rope fixed at one end to the top of said membrane and at the other end to said diaphragm in a central portion thereof.

In a particularly preferred variant, said cover comprises access means to the inside thereof and a walkway arranged in a cantilever fashion along the perimeter edge of the containment walls of said tank, on the outside thereof, adapted to define a walkable surface, where said walkway comprises a delimiting external railing and said continuous fixing means of said flexible membrane are arranged both on the top of said external railing, and on the vertical walls of the tank below said walkway.

The current invention presents numerous advantages.

The diaphragm separates the volume subtended by the cover into two chambers, a lower chamber and an upper chamber, and advantageously maintains the harmful gases and the malodorous substances emitted from the surface of the slurry confined only in the lower chamber.

In this way, the volume of polluted air remains limited and, if the lower chamber must be "washed" to allow operators to access the inside of the cover, the amount of energy and the time required would be greatly reduced.

Advantageously, said diaphragm is produced by means of a very light net with a sufficiently fine mesh to itself create a loss of load for the insufflated air and simultaneously to allow any humidity caused by condensation to precipitate onto the slurry without making the net heavier.

The point type continuous fixing means along the edge of the diaphragm allow it to be maintained in position, while providing through holes for specific and suitable amounts of clean air.

Advantageously, these through holes for the air, produced by means of transverse pipes, are calibrated so as to allow the insufflated air to flow downward with a slight loss of load, thereby generating a difference in pressure between the chamber positioned above the diaphragm (at a higher pressure) and the chamber positioned below the diaphragm, where the polluted air to be treated is confined.

The calibrated openings positioned along the edge of the diaphragm distribute the clean air evenly around the perimeter of the tank above any walkable surface, to ensure the operator receives a flow of prevalently clean air.

The walkway arranged in a cantilever fashion along the perimeter edge of the tank, but enclosed inside the cover, in fact produces an advantageous walkable corridor for the passage of the operators, who can thus access and remain inside the cover to carry out maintenance operations and inspections, without having to remove the membrane.

The supporting ropes with which the diaphragm is hung from the membrane in its central portion prevent the formation of concavities, folds and loops in which condensate could accumulate, making the diaphragm heavier with the risk of tearing it.

BRIEF DESCRIPTION OF THE DRAWINGS

These and other advantages will be more apparent and evident from the description of the invention, set forth below with the aid of the drawings, which represent an example of embodiment, illustrated by way of non-limiting example, wherein.

DETAILED DESCRIPTION OF A PREFERRED EXAMPLE OF EMBODIMENT OF THE INVENTION

Figure 1:
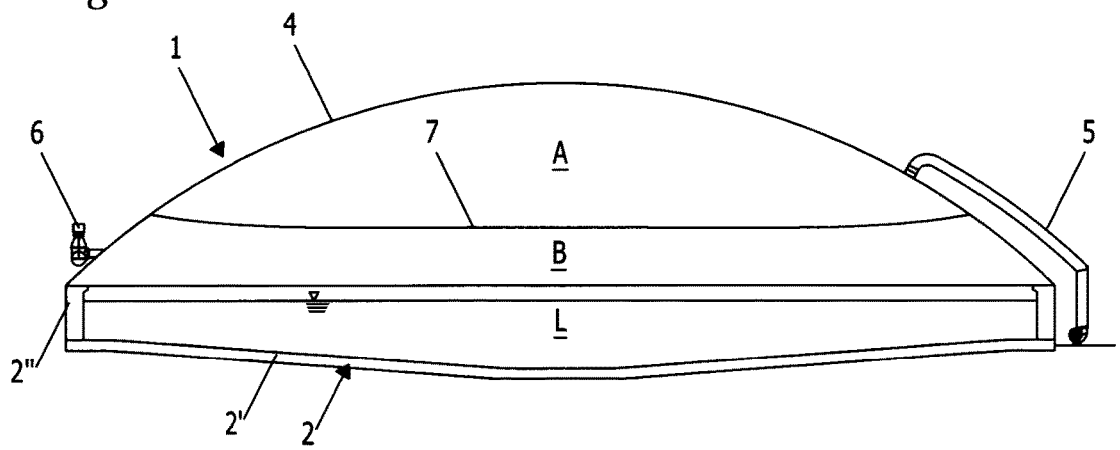
FIG. 1 represents, in a sectional view along a vertical plane, a pressostatic odor control cover for slurry treatment tank with device for reducing the inner volume occupied by the harmful and malodorous gases according to the invention.

With reference to the figures, there is illustrated a pressostatic odor control cover 1 for slurry L treatment tank 2, for example a sedimentation tank containing a liquid rich in fermentable organic substances.

Said sedimentation tank 2, having a circular shape, consists of a base 2' and of a lateral containment wall 2" and is closed at the top by said odor control cover 1.

Said odor control cover 1 essentially comprises a gas impermeable flexible membrane 4, adapted to cover the surface of said tank 2, and continuous fixing means 4' of said membrane 4 to said tank.

Said odor control cover 1 is of pressostatic type and comprises insufflation means 5 of air inside it and discharge valve means 6 of said air upon reaching a predetermined pressure value, obtainable by means of calibrating said valve means 6.

Said cover 1 comprises a diaphragm 7 permeable to liquids and to gases, arranged below said membrane 4 to delimit, cooperating with the membrane 4 and the surface of the slurry L contained in said tank 2, a reduced volume available to the harmful gases and to the malodorous substances released from the slurry.

In particular, said diaphragm 7 divides the volume subtended by the cover 1 into two separate chambers A, B.

The upper chamber A, delimited by the top of the membrane 4 and by the diaphragm 7, contains clean air maintained pressurized by the continuous insufflation of fresh air from outside.

The lower chamber B, delimited by the diaphragm 7, by the lower portion of the membrane 4 and by the free surface of the slurry L contained in the tank 2, contains polluted air, i.e., mixed with gases released from the slurries and with malodorous substances or emissions produced by the treated slurries and by the sedimented material.

Figure 2:
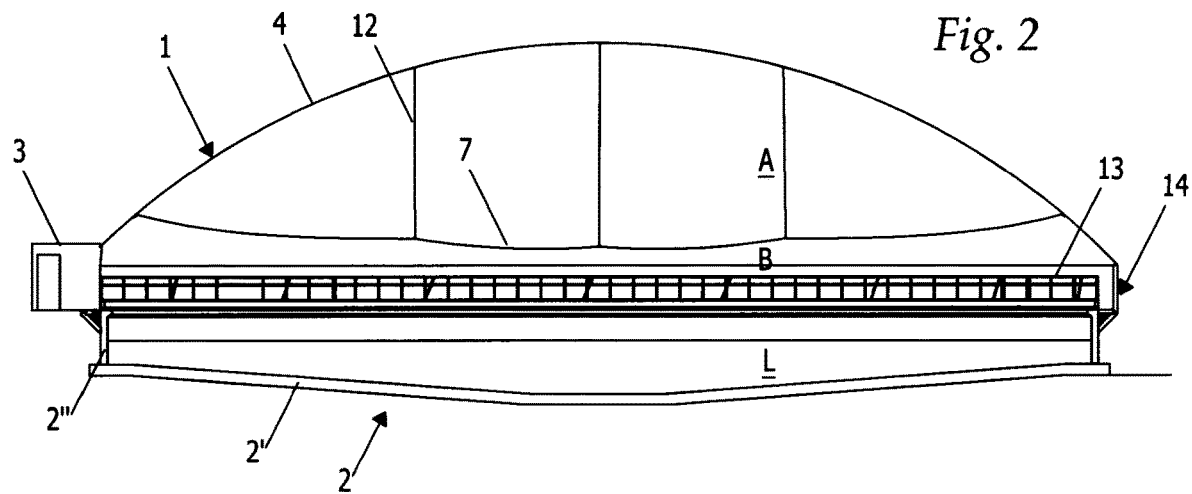
FIGS. 2 and 3 represent, in a sectional view along two different diametrical vertical planes, a pressostatic odor control cover according to a possible variant of embodiment of the invention.
Figure 3:
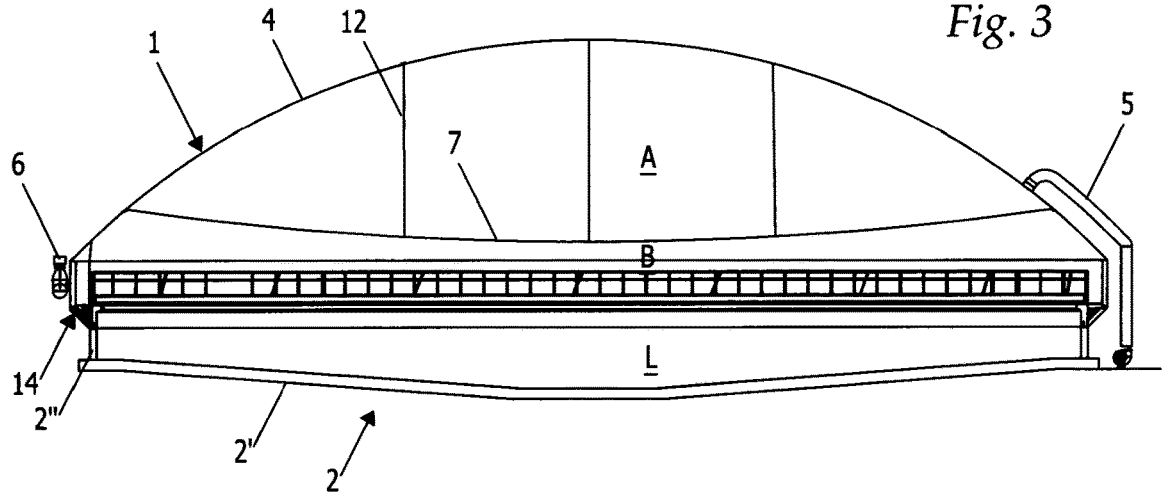

With reference to the particular variant illustrated in FIGS. 2 and 3, said tank 2 also comprises a travelling bridge scraper 13 arranged along a diameter thereof, and said cover 1 comprises a walkway 14 arranged in a cantilever fashion along the perimeter edge of said tank 2, on the outside thereof.

Said travelling bridge scraper 13 is adapted to help the sedimented materials to reach the central well for their removal, and to facilitate discharge of foam and floating material.

Said walkway 14 is adapted to define a walkable surface P for the operators during inspections and maintenance operations.

To make said cover 1 accessible to the operators, and thus allow them to reach said walkway 14, said cover 1 is provided with an airlock 3 with two doors, of the type generally used for the pressostatic covers of sport domes.

Figure 4:
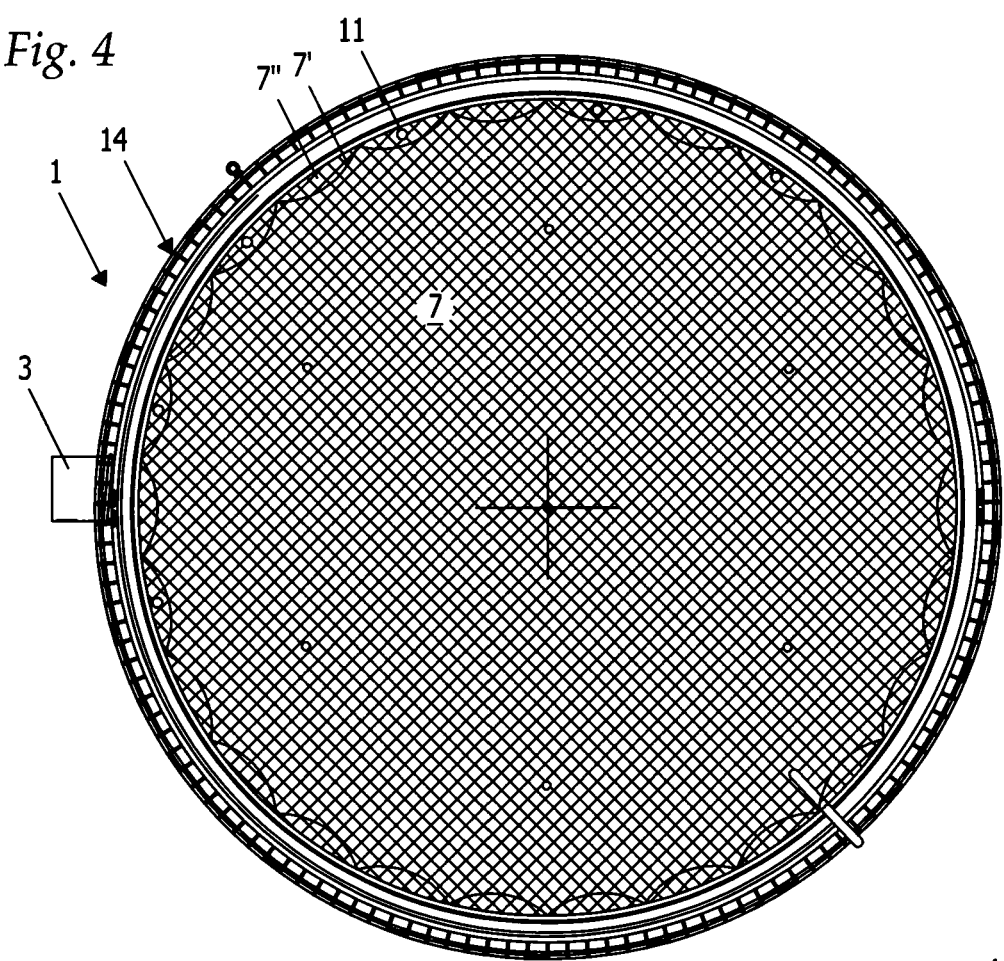
FIG. 4 represents, in a sectional view along a horizontal plane, the cover of FIGS. 2 and 3.
Figure 5:
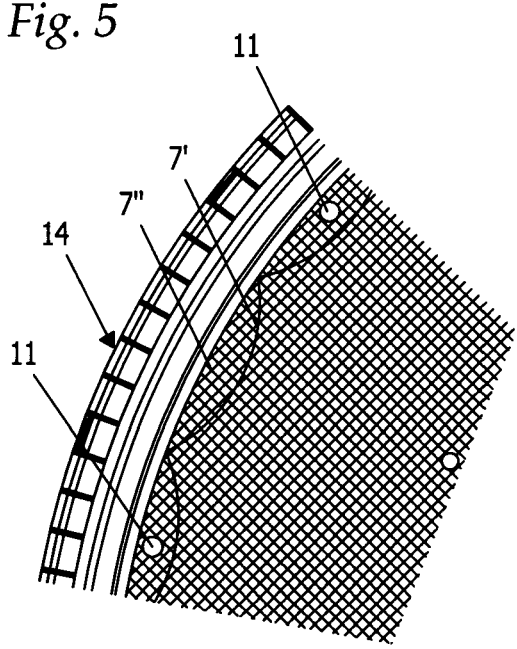
FIGS. 5 and 6 represent two details respectively of the sectional views of FIG. 4 and FIG. 2.

With particular reference to FIGS. 4 and 5, where the membrane has been made transparent for clarity of representation, there is illustrated said diaphragm 7 permeable to liquids, produced by means of a fine mesh net. In the figures, the mesh of the net has been deformed for clarity of representation, but its holes are of sufficiently small size to produce a loss of load that maintains the upper chamber A at a slightly higher pressure than the lower chamber B and thus prevents polluted air from passing from the lower chamber B to the upper chamber A.

To ensure the correct value between internal pressures in the two chambers A, B, so as to maintain the harmful gases confined below the diaphragm 7, said insufflation means 5 of air are connected above said diaphragm 7, while said discharge valve means 6 are connected below it and are appropriately calibrated.

By way of example, for a tank 2 with a diameter of 45 meters, said diaphragm 7 is fixed to the membrane 4 at a height of about 3 meters with respect to the edge of the tank 2, and the discharge valve means 6 of the polluted air draw the air at the side of the cover 1 with outlets positioned under the diaphragm 7 at about 1 meter from the edge of the tank 2.

Figure 6:
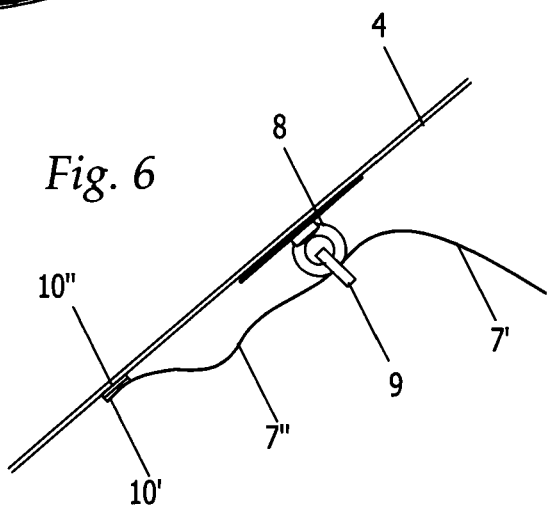

The cover 1 comprises various mechanical fixing means of said diaphragm 7 to said membrane 4, not air-tight, illustrated in the detail of FIGS. 5 and 6.

First mechanical fixing means are of point type and are distributed angularly at equal distances from one another, along the edge 7' of said diaphragm 7.

In particular, said first mechanical fixing means comprise eyelets 8 welded to said membrane 4 and tapes 9, at least partially covered in Velcro®, adapted to fold over themselves and to engage said eyelets 8 passing through a portion of the edge of the net that produces said diaphragm 7.

Second mechanical fixing means are instead of substantially continuous type, and involve the whole of the edge 7' of said diaphragm 7.

In fact, said diaphragm 7 has a larger diameter than the diameter of the covering dome 1 measured at its connection circumference. In this way, the edge strip of the diaphragm 7 in excess produces a sort of apron 7" that can be closed continuously along the membrane 4.

In particular, said second mechanical fixing means comprise a strip of loops of Velcro® 10' applied along the edge strip 7" of said diaphragm 7 and adapted to cooperate with a corresponding strip of hooks of Velcro® 10" applied to said membrane 4 at the height of said diaphragm 7.

Once the edge strip 7" of the diaphragm 7 has been closed along a circumference of the dome, it is however necessary to provide through holes for clean air to pass from the upper chamber A to the lower chamber B, so as to prevent the porosity of the net from changing over time and no longer being sufficient to allow clean air to pass through with a minimum loss of load.

Said through holes are produced by means of pipes 11, arranged transverse to said diaphragm 7 so as to pass through it.

Advantageously, said pipes 11 are distributed close to the edge 7' of the diaphragm 7, or along the circumference of the sedimentation tank 2, above the walkway 14 for the operators.

Finally, as illustrated in the sectional views of FIGS. 2 and 3, said cover 1 comprises third mechanical fixing means.

Said third fixing means comprise supporting ropes 12 hung from said membrane 4 and fixed in the central portion of said diaphragm 7.

Figure 7:
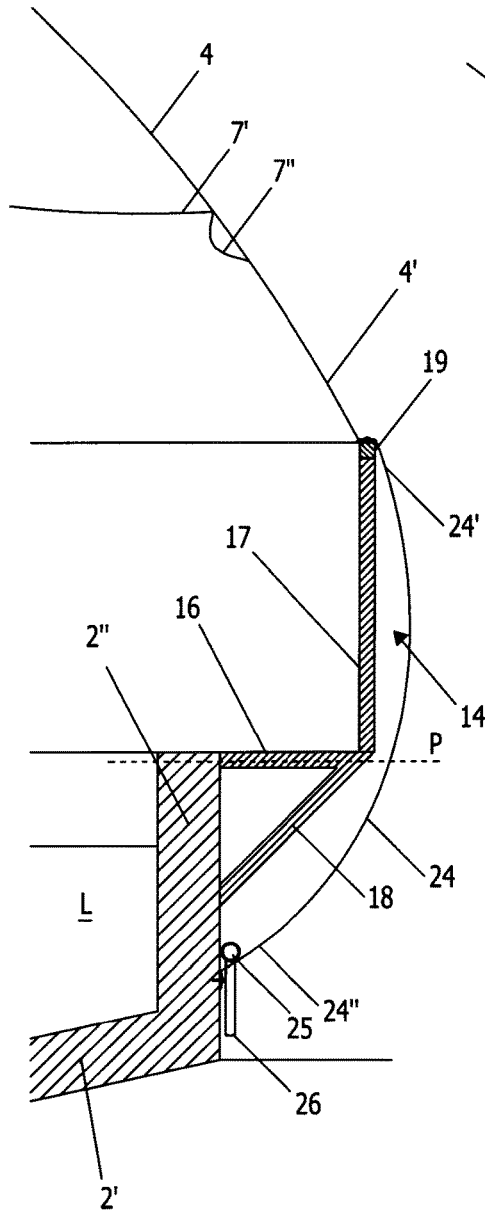
FIG. 7 represents, in a vertical sectional view with proportions intentionally deformed for clarity of representation, a part of the pressostatic odor control cover according to a possible variant of the invention.
Figure 8:
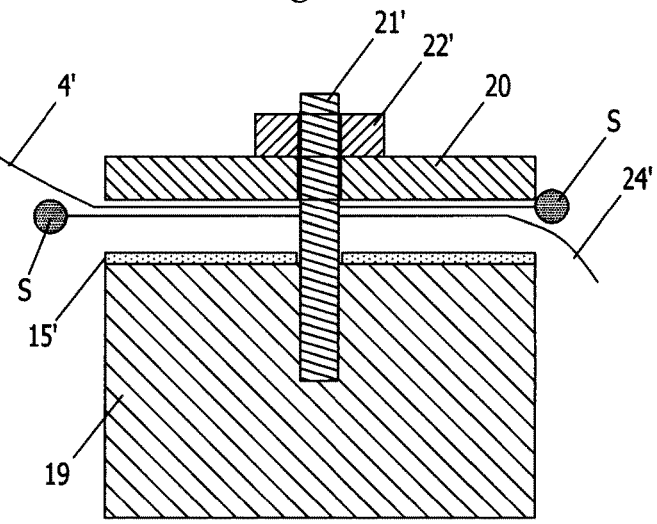
FIGS. 8 and 9 represent, in a sectional view, details of FIG. 7.
Figure 9:
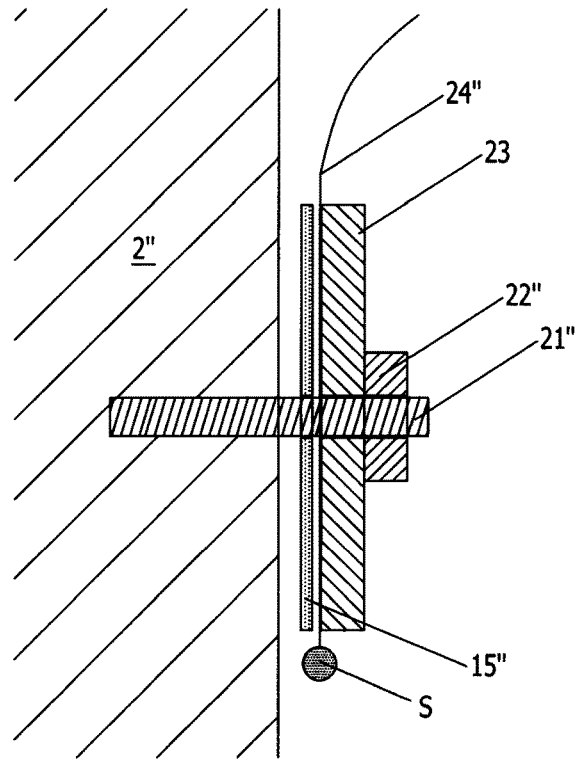

With particular reference to FIGS. 7-9, there is illustrated a variant of the cover 1 according to the invention provided with a walkway 14 for the operators.

Said walkway 14, made entirely of stainless steel to withstand the aggression of chemical agents released by the slurry, comprises:
 a ring-shaped horizontal platform 16;
 a plurality of vertical uprights 17, arranged equidistant from one another and fixed along the outer edge of said platform 16, which extend above it;
 a plurality of supporting struts 18 for said horizontal platform 16;
 an upper connecting beam 19 for said vertical uprights 17.

In the variant illustrated, the flexible membrane 4 is mechanically and hermetically anchored to the tank 2 in two points, i.e., at the top of the vertical uprights 17 of the walkway 14, along the connecting beam 19, and along the lateral containment wall 2" of the tank.

In particular, the margin 4' of the membrane 4 is fixed directly, by means of first fixing means, to the connecting beam 19 of the vertical uprights 17 of the walkway 14, and said membrane 4 comprises an extension strip 24, adapted to close the space between the vertical uprights 17 of the walkway 14 and to be fixed, by means of second fixing means, along the wall 2" of the tank 2.

With reference to the sectional view of the detail of FIG. 8, said first fixing means comprise a first steel section bar 20, adapted to retain, by means of anchor bolts 21' and nuts 22', the margin 4' of said membrane 4 to said beam 19.

With reference to the sectional view of the detail of FIG. 7, there is illustrated the extension strip 24 of the membrane 4 adapted to fill the space between the vertical uprights 17 of the walkway 14 and to close said cover 1 on the lateral containment wall 2" of the tank 2.

A first edge 24' of said strip 24 is retained by said first section bar 20 on the connecting beam 19 of the uprights 17.

Said second fixing means, as illustrated in FIG. 9, comprise a second steel section bar 23 adapted to retain, by means of anchor bolts 21" and nuts 22", a second edge 24" of said strip 24 on the wall 2" of the tank 2.

Any folds S of the margin 4' of the membrane 4 and of the edges 24', 24" of the strip 24 on a cord produce a tear-proof structure.

To ensure perfect pneumatic seal of the odor control cover 1, said cover 1 comprises double gas-tight sealing means, i.e. two gaskets 15' and 15" provided below said membrane 4, respectively against said beam 19, at said first fixing means, and against said lateral containment wall 2", at said second fixing means.

With reference to the sectional view of FIG. 7, said cover 1 comprises a condensation liquid collection channel.

Said channel is produced by means of a perforated pipe 25 provided at said second fixing and sealing means along the lateral containment wall 2" of said tank 2 below said walkway 14.

Ducts 26 are provided along said perforated pipe for discharge and disposal of the condensate collected.

Said ducts 26 are provided with specific manually or automatically operated valve means (not illustrated) to prevent the escape, even minimum, of gases and odors.

Operation of the pressostatic odor control cover is described below.

The insufflation means of air 5 continuously feed clean air into the upper chamber A of the cover 1.

The clean air passes from the upper chamber A to the lower chamber B mainly through the pipes 11, which offer less resistance to the passage of the air with respect to the mesh of the net, in any case generating a certain loss of load which determines a slightly higher pressure in the chamber A with respect to the chamber B.

Passing into the chamber B the air mixes with the harmful gases and the malodorous substances released from the slurries.

The polluted air is then emitted from the chamber B through the discharge valve means 6, which in turn introduce a further loss of load.

Calibration of the discharge valve means 6 determines the operating pressure of the chamber B and of the chamber A, and the flow rate of the air insufflation means 5.

The invention claimed is:

1. A pressostatic odor control cover for a slurry treatment tank for a slurry, said treatment tank being delimited by a base and lateral containment walls, said pressostatic odor control cover comprising:
    a gas impermeable flexible membrane;
    a gas-tight continuous fixing system configured to fix a margin of said membrane to said tank;
    an insufflation device configured to insufflate air inside said cover, the insufflation device being connected to the membrane;
    a discharge valve configured to discharge said air out of said cover; and
    a diaphragm permeable to liquids and gases, the diaphragm being disposed below the membrane with respect to the base of the tank and fixed to the membrane to delimit a reduced volume of said odor control cover occupied by harmful gases and malodorous substances released from a free surface of the slurry, the diaphragm dividing the reduced volume subtended by the pressostatic control cover into two separate chambers including
        an upper chamber delimited by the diaphragm and a top of the flexible membrane, and
        a lower chamber delimited by the diaphragm, a lower portion of the flexible membrane with respect to the base of the tank, and the free surface of the slurry,
    wherein said air insufflation device is connected to said membrane above said diaphragm with respect to the base of the tank, the air insufflation device being configured to insufflate new air in the upper chamber to maintain the upper chamber at a higher pressure than a pressure in the lower chamber, thereby preventing a passage of polluted air from the lower chamber to the upper chamber, and
    said discharge valve is connected to said membrane below said diaphragm with respect to the base of the tank.

2. The pressostatic odor control cover according to claim 1, wherein said diaphragm comprises a fine mesh net.

3. The pressostatic odor control cover according to claim 1, further comprising a non-gas-tight mechanical fixing system configured to fix said diaphragm to said membrane.

4. The pressostatic odor control cover according to claim 3, wherein said non-gas-tight mechanical fixing system is a point-type system, distributed along an edge of said diaphragm.

5. The pressostatic odor control cover according to claim 4, wherein the non-gas-tight mechanical fixing system comprises
    a plurality of eyelets welded to said membrane, and
    a plurality of tapes that is at least partially covered in Velcro® the tapes being configured to fold over themselves and to engage said eyelets passing through a portion of the edge of said diaphragm.

6. The pressostatic odor control cover according to claim 5, wherein the non-gas-tight mechanical fixing system comprises continuous connection devices that extend along the edge of said diaphragm.

7. The pressostatic odor control cover according to claim 6, wherein the non-gas-tight mechanical fixing system comprises a strip of hooks of Velcro® disposed along a horizontal plane of said cover, and a strip of loops of Velcro® disposed along the edge of said diaphragm.

8. The pressostatic odor control cover according to claim 6, further comprising a plurality of pipes, disposed transverse to said diaphragm along the edge of the diaphragm, the pipes being configured to define through-holes to allow the insufflated air to flow under said diaphragm.

9. The pressostatic odor control cover according to claim 3, wherein the gas-tight continuous fixing system comprises a supporting rope fixed at one end to the top of said membrane and at the other end to said diaphragm in a central portion thereof.

10. The pressostatic odor control cover according to claim 1, further comprising:
    an access device configured to access the inside of the cover; and
    a walkway disposed in a cantilever fashion along the perimeter edge of the containment walls of said tank, on the outside thereof, the walkway defining a walkable surface, said walkway comprising an external railing and said gas-tight continuous fixing system are both disposed on a top of said external railing and on the lateral containment walls of the tank below said walkway.

* * * * *